(12) United States Patent
Fuller et al.

(10) Patent No.: US 6,169,553 B1
(45) Date of Patent: *Jan. 2, 2001

(54) METHOD AND APPARATUS FOR RENDERING A THREE-DIMENSIONAL SCENE HAVING SHADOWING

(75) Inventors: Richard J. Fuller, Nashua, NH (US); Andrew E. Gruber, Arlington, MA (US)

(73) Assignee: ATI Technologies, Inc., Thornhill (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/903,216

(22) Filed: Jul. 2, 1997

(51) Int. Cl.[7] .............................. G06T 15/20; G06T 15/00
(52) U.S. Cl. ............................................ 345/427; 345/419
(58) Field of Search ................................... 345/426, 422, 345/419, 427, 423, 431, 432, 430, 428, 425

(56) References Cited

U.S. PATENT DOCUMENTS 5,083,287 * 1/1992 Obata et al. .......................... 345/426
5,828,378 * 10/1998 Shiraishi .............................. 345/422

* cited by examiner

*Primary Examiner*—Jeffery Brier
*Assistant Examiner*—Chante' E. Harrison
(74) *Attorney, Agent, or Firm*—Markison & Reckamp, P.C.

(57) ABSTRACT

A method and apparatus for rendering shadows on a three-dimensional scene is accomplished by generating a light source texture map of the given three-dimensional scene. The light source texture map is generated based on a viewing perspective being proximal to a light source projection. Once the light source texture map has been generated, an object element of the three-dimensional scene is rendered based on the light source texture map and image information. The image information includes vertex components corresponding to object elements of the three-dimensional scene.

19 Claims, 6 Drawing Sheets

METHOD AND APPARATUS FOR RENDERING A THREE-DIMENSIONAL SCENE HAVING SHADOWING

TECHNICAL FIELD OF THE INVENTION

This invention relates generally to video graphics processing and more particularly to video graphics processing of a three-dimensional scene having shadowing.

BACKGROUND OF THE INVENTION

Computers are known to include a central processing unit ("CPU"), cache memory, hard drive memory, disk drive memory, video graphics circuitry, and audio processing circuitry. The video graphics circuitry is operably coupled to a computer screen such that images, objects, and/or scenes, which the CPU processed and/or generated, may be displayed. Such images, objects, and/or scenes, are stored as a plurality of triangles, where the number of the triangles varies greatly depending on the object, image, and/or scene. For example, if a square is being presented, it could be represented by two triangles, while it may take more 20,000 triangles to represent a human face. Each of the triangles of an image has associated vertex parameters which includes RGB (red, green, blue) parameters, x, y, and z parameters, texture parameters ("STW") and/or alpha parameters. The RGB parameters indicate the particular color of the triangle and may be an 8-bit, a 16-bit, or a 24-bit value. The x and y parameters indicate a vertex's particular location on the two-dimensional computer screen. The z parameter indicates the particular triangle's depth in relation to the screen and with other triangles. Texture parameters indicate the particular texture pattern to be assigned to the triangle and the alpha parameter indicates the translucency of the triangle.

When shadowing is being added to a scene, the particular scene is first drawn without the shadowing and stored in a frame buffer. Once the scene is drawn, the CPU and/or the video graphics circuitry determines light source projection angles and where the shadows will be cast given a particular viewing perspective. Once this is determined, a new series of triangles is created to represent the shadows, which is also stored in the frame buffer. If the shadows are relatively small in number and/or fall on simple surfaces, such as a plane, the new shadow triangles require only a small portion of memory. But, for shadows falling on complex surfaces, such as a human face, the number of new shadow triangles may far exceed the number of triangles to make up the complex surface, thus requiring a substantial amount of additional memory.

As one would expect, for a computer to process shadows falling on a complex surface, the computer would need to include a database capable of handling the worse case shadow processing, where worse case shadow processing refers to the maximum number of additional triangles that would be needed to generate the shadowing effect. For example, the triangle database may need to be four times the size of a database if shadowing were not being performed.

In addition to increasing memory requirements, the complexity of the shadow processing increases non-linearly as the number of triangles increase. As the complexity increases, dedication of the CPU to shadow processing also increases, thereby reducing the overall efficiency of the computer.

Therefore, a need exists for a method and apparatus that processes video graphics shadowing with minimal memory requirements and with minimal dedication of the CPU.

DETAILED DISCUSSION OF THE DRAWINGS

Generally, the present invention provides a method and apparatus for rendering shadows on a three-dimensional scene. This may be accomplished by generating a light source texture map of the given three-dimensional scene. The light source texture map is generated based on a viewing perspective being proximal to a light source projection. Once the light source texture map has been generated, an object element of the three-dimensional scene is rendered based on the light source texture map and image information. The image information includes vertex components corresponding to object elements of the three-dimensional scene. With such a method and apparatus, providing shadows on three-dimensional scenes may be accomplished without the widely varying memory requirements of past techniques, without the generation of additional triangles to represent the shadowing information, and with minimal dedication of the CPU.

Figure 1:
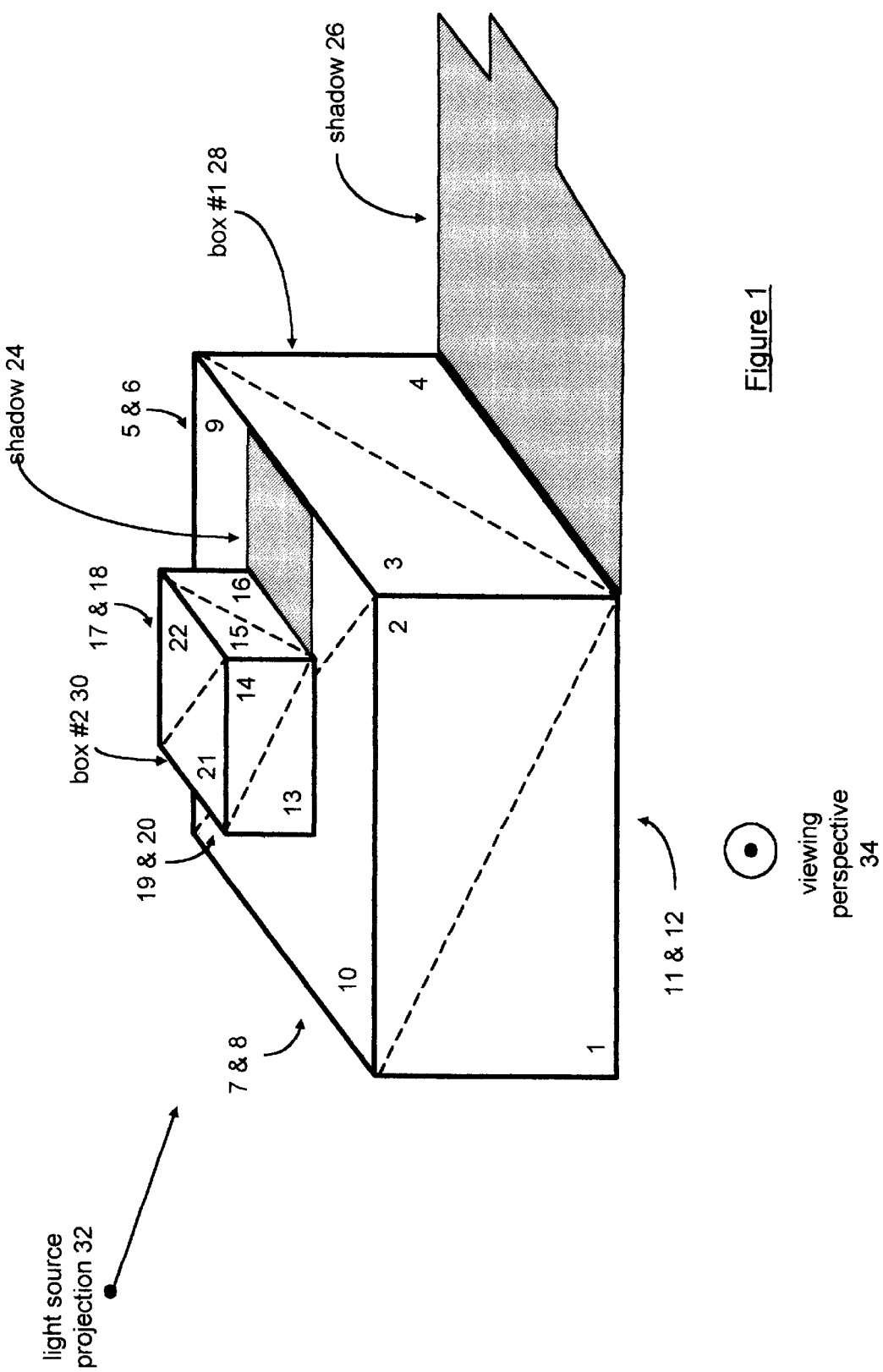
FIG. 1 illustrates a three-dimensional scene having shadowing in accordance with the present invention.

The present invention can be more fully described with reference to FIGS. 1 through 7. FIG. 1 illustrates a graphical representation of a three-dimensional scene. The three-dimensional scene includes a first box 28 and a second box 30. The first box 28 is comprised of a plurality of object elements which may be triangles or some other polygon. Each of the object elements, which are shown as triangles, representing box 1 have vertex information stored in a database of a computer system. From the given viewing perspective 34, which is into the paper, the triangles that are visible of the first box 28 are triangles 1, 2, 3, 4, 9 and 10. The triangles of the first box 28 that are not visible include triangles 11 and 12, which represent the bottom of the first box with respect to the viewing perspective 34; triangles 7 and 8, which represent the left-side of the first box; and triangles 5 and 6, which represent the back of the box.

The second box 30 is also comprised of a plurality of object elements, which are also shown as triangles. The triangles visible from the particular viewing perspective 34 are triangles 13, 14, 15, 16, 21, and 22. The triangles which are not visible include triangles 19 and 20, which represent the left-side of the second box, and triangles 17 and 18 which represent the back of the second box 30. Thus, when this particular three-dimensional scene is rendered on a computer screen, the triangles shown in FIG. 1 will be rendered on the computer screen.

With the light source projection 32 being from the left-side of the page, it casts shadows 24 and 26. Shadow 24 will be rendered simultaneously with the rendering of triangle 9. In other words, when triangle 9 is rendered the shadow information representing shadow 24 will be rendered as part of triangle 9. Rendering of shadow 26 will be done as part of the background rendering.

Figure 2:
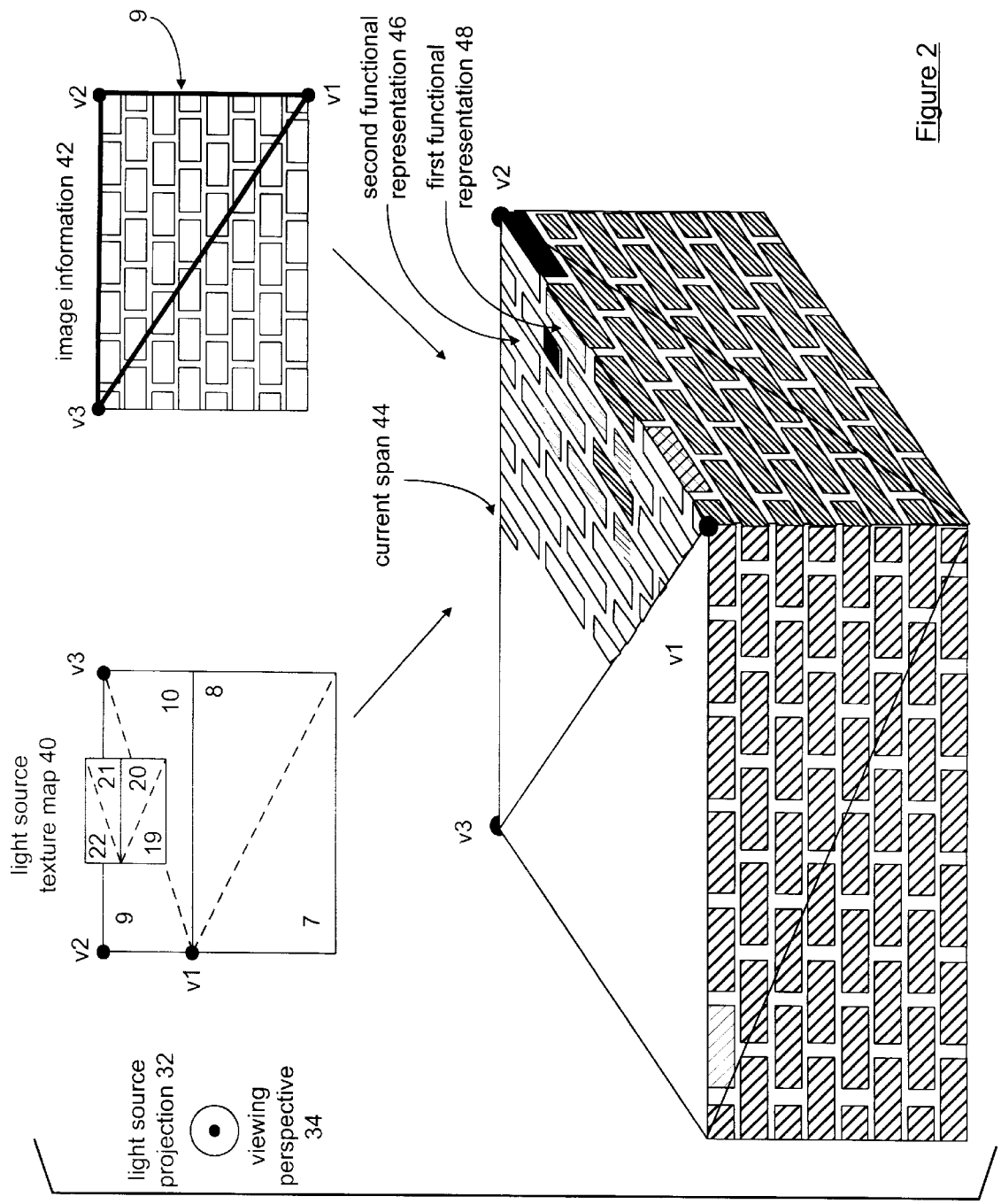
FIG. 2 illustrates a process for rendering shadow information onto a three-dimensional scene in accordance with the present invention.

FIG. 2 illustrates a graphical representation of rendering triangle 9. The process begins by first generating a light source texture map 40. This is generated by having the light source projection 32 and the viewing perspective 34 being in a proximal location. For the light source texture map 40, as shown, the light source projection 32 and the viewing perspective 34 are from the same angle. As one skilled in the art will readily appreciate, the light source projection 32 and the viewing perspective 34 may not be at the same angle with respect to the three-dimensional scene but may be in any given relationship.

The light source texture map 40 is shown as a two-dimensional object and represents the triangles that are visible from the light source projection 32. With reference to FIG. 1, the triangles visible with respect to light source projection 32 are triangles 7, 8, 9 and 10 of the first box 28 and triangles 19, 20, 21, and 22 of the second box 30.

With reference to the upper-right portion of FIG. 2, image information 42 is shown to be a texture map of a brick pattern. Note that the image information 42 may include a texture map (which is shown) or it may include RGB values, fog information, water reflection information, or any other type of overlay and/or pattern video information. The image information 42 is also shown with triangle 9 superimposed thereon. Triangle 9 includes vertexes V1, V2 and V3. For each vertex of triangle 9, vertex parameters will be indicated. For example, for vertex 1, the texture parameters would indicate that, in relation to the image information 42, its position would be in the lower-right corner of the image information. The x and y parameters for V1, indicate that V1 would be positioned as shown on a computer screen.

To render triangle 9 on the two-dimensional screen, which is represented by the three-dimensional drawing as shown, triangle 9 is rendered via a plurality of spans. The spanning process as shown is from vertex 2 to vertex 1 spanning down towards vertex 3. The spanning process includes both spanning the image information 42 and the light source texture map 40.

The image that is rendered is dependent upon the combined spanning of the light source texture map 40 and the image information 42. Starting at vertex V2, and heading towards vertex V1, on the light source texture map 40, triangle 9 is visible. While triangle 9 is visible, with respect to the light source texture map 40, the image that is rendered for this particular span is reflective of the image information 42, which is referred to as second functional representation of the image information. When spanning the light source texture map 40 hits triangle 22, triangle 9 is no longer visible from the light source projection 32. When this occurs, shadowing is required. Thus, when the image information 42 is rendered onto the computer screen, it is represented as a first functional representation 48. The first functional representation 48 may be the image information 42 based on a particular light function, which includes adding a light offset value, and/or interpolation of pixel information of proximal pixel locations as the lighting function. (The interpolation of pixel information will be discussed in greater detail with reference to FIG. 4.)

Continuing spanning from V2 to V1, the span of the light source texture map 40 will pass from triangle 22 to triangle 21 back to triangle 9. When spanning triangle 9 again, the image rendered will be the second functional representation 46 of the image information 42. The second functional representation 46, may include the exact representation of the image information 42, or some functional representation thereof Such a functional representation may include adding a light offset value, removing a light offset value, and/or interpolation of pixel information in a proximal location.

The spanning of the light source texture map 40 and the image information 42 to render triangle 9 continues until the triangle has been completely rendered. As shown, the rendering is in a current span 44 such that the triangle 9 has not been completely rendered. But, from the information that has been rendered, it is shown that the first functional representation 48 represents shadowing, while the second functional representation 46 represents no shadowing. Further note that triangles 1 through 4 are shown to be shadowed. As can be seen from the light source texture map 40, triangles 1 through 4 are not visible from the given light source projection 32. Further note that when triangle 10 is rendered, it is almost completely within the light source texture map thus most of it will be represented by the second functional representation 46 with just a small portion represented by the first functional representation 48.

Figure 3:
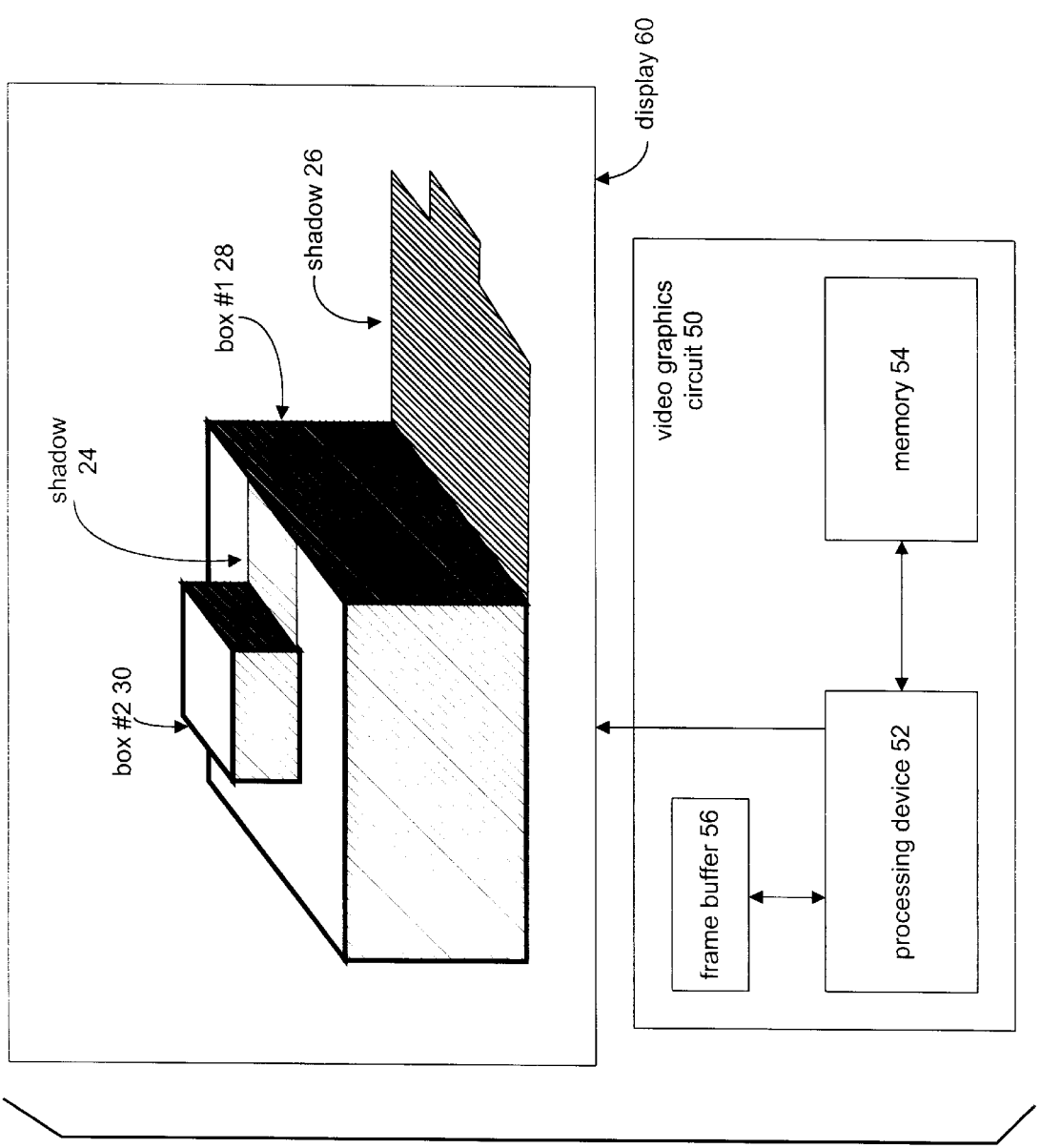
FIG. 3 illustrates a computer system which is in accordance with the present invention.

FIG. 3 illustrates a computer system that includes a video graphics circuit 50 and a corresponding display 60. The video graphics circuit 50 is shown to include a processing device 52, memory 54, and a frame buffer 56. Note that the processing device 52 may be a portion of the CPU, or a stand alone processing device such as a microprocessor, microcontroller, microcomputer, or digital signal processor. The processing device 52 performs functions such that the three-dimensional image is rendered with the appropriate shadowing. Such functions will be further discussed in greater detail with reference to FIGS. 5 through 7 below.

The frame buffer 56 stores the particular pixel information for subsequent display on display 60. Memory 54 includes the programming instructions for the algorithms to render the three-dimensional image having shadowing in accordance with the present invention. Such programming instructions will be discussed in further detail with reference to FIGS. 5 through 7 below.

The display 60 is presenting the three-dimensional scene as depicted in FIG. 1. The three-dimensional scene, as shown, includes the light source projection 32 and the viewing perspective 34 as being the angles shown in FIG. 1. Thus, the shadow cast include shadow 24 and shadow 26. Further note that the front surface and right-side surface of the first and second boxes 28 and 30 are also shown to be shadowed. This occurs because each of these surfaces are not present in the light source texture map 40, as previously discussed with reference to FIG. 2.

Figure 4:
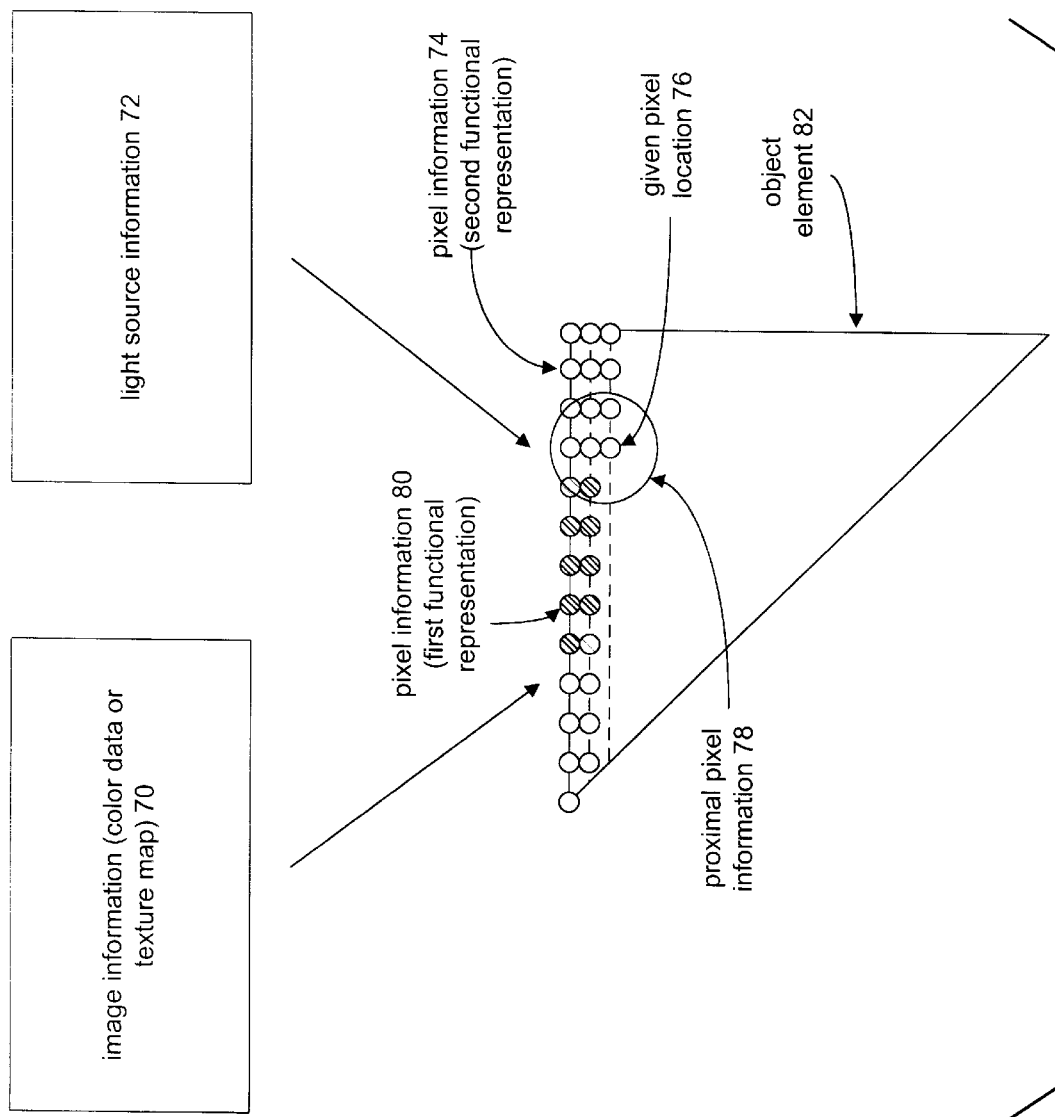
FIG. 4 illustrates a graphical representation of generating pixel information in accordance with the present invention.

FIG. 4 illustrates a graphical representation of rendering a particular object element 82. Rendering of object element 82 is done by combining the image information 70, which may be color data or a texture map, and light source information 72. As the object element 82 is spanned, pixel information 74 and 80 are generated. The pixel information 74 and 80 are based on the light source information 72 and the image information 70. When the light source information 72 indicates that the pixel information for a given pixel location 76 is in the line of sight with a particular light source, the pixel information will be represented as a second functional representation. Such a second functional representation of the image information 70 may be substantially equal to the image information 70, or some functional variation thereof. Such a functional variation may include adding a light offset value, subtracting a light offset value, or interpolation of proximal pixel information 78 which includes the pixels that are in a proximal location to the given pixel location 76. The proximal location may vary depending on the particular granularity of shading required. For example, for the given pixel location 76, only pixels that are physically in contact with the pixel at the given pixel location may be used. Alternatively, the proximal location may include several pixels in each direction. As one skilled in the art will readily appreciate, the number of pixels used to interpolate the pixel information at the given pixel location 76 may vary greatly.

The interpolation of the pixel information at the given location 76 is based on the pixel information shown in the proximal pixel information 78. Thus, at the given pixel location 76, the pixel information will be a combination of pixel information 74 and pixel information 80 that are within the proximal location. The combination will be an interpolation, or weighting, of the pixel information 74 and 80. As such, the pixel information at the given pixel location 76 will be a blending of the pixel information 80 and pixel information 74.

The spanning of the object element 82 of FIG. 4 continues until pixel information has been generated for each pixel location of the object element. As one skilled in the art will readily appreciate, the spacing between pixels varies depending on the resolution of the computer screen.

Figure 5:
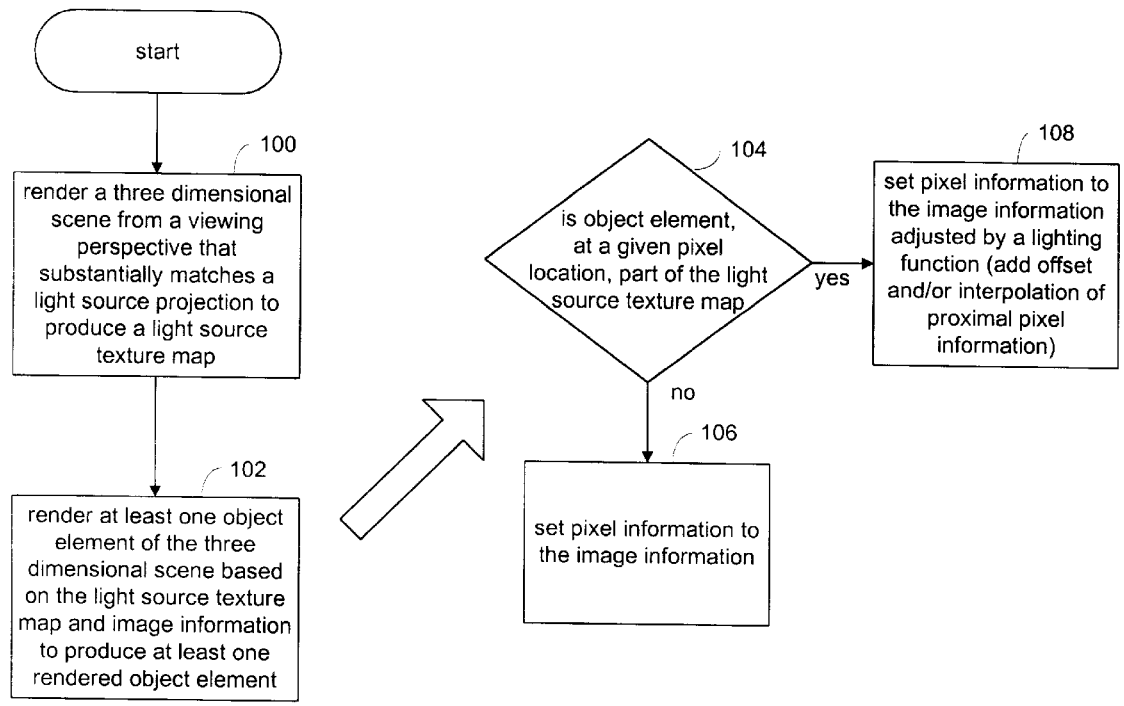
FIG. 5 illustrates a logic diagram that may be used to render shadows on a three-dimensional scene in accordance with the present invention.

FIG. 5 illustrates a logic diagram which may be used to render three-dimensional scenes that include shadowing. The process begins at step 100 where a three-dimensional scene is rendered from a viewing perspective that substantially matches a light source projection. Such rendering produces a light source texture map.

The process then proceeds to step 102 where at least one object element of the three-dimensional scene is rendered based on the light source texture map and image information. Such rendering produces at least one rendered object element. At step 104, a determination is made as to whether, at a given pixel location of the object element, the given pixel location is in the line of sight of a light source, or part of the light source texture map.

If the pixel location is not part of the light source texture map or not in the line of sight of the light source, the process proceeds to step 108 where the pixel information for the given pixel location is set to the image information adjusted by a lighting function. The lighting function may be setting the pixel information to the image information, adding a light offset value, and/or interpolation of proximal pixel information. If, however, the object element, at the given pixel location, is part of the light source texture map or is in the line of sight of the light source, the process proceeds to step 106. At step 106, the pixel information is set to the image information.

Figure 6:
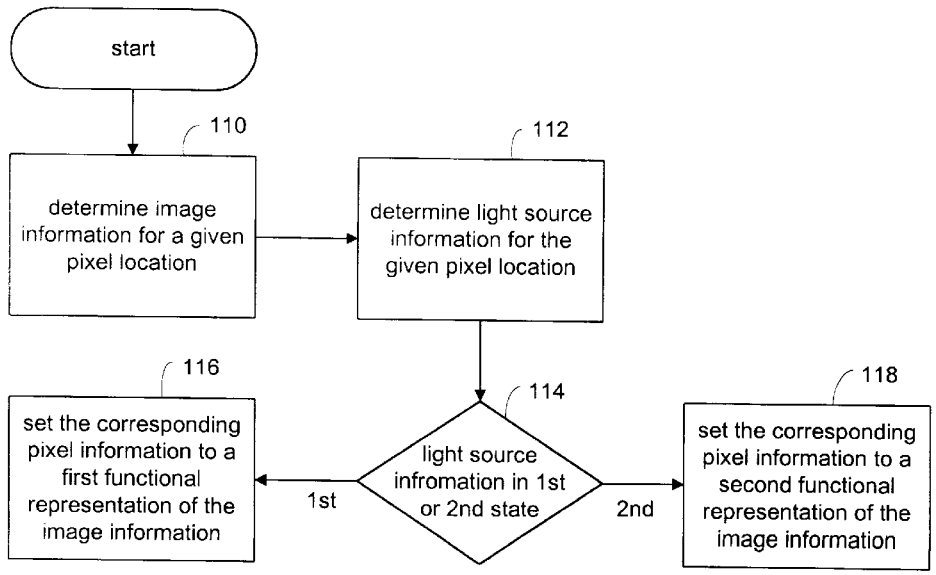
FIG. 6 illustrates a logic diagram of an alternate process for rendering shadows on a three-dimensional scene in accordance with the present invention.

FIG. 6 illustrates a logic diagram for rendering a three-dimensional scene having shadows. The process begins at step 110 where image information at a given pixel location is determined. Having made this determination, the process proceeds to step 112 where light source information for the given pixel location is determined. The process then proceeds to step 114 where a determination is made as to whether the light source is in a first or second state.

If the light source information is in a first state, the process proceeds to step 116 where the corresponding pixel information of the given pixel location, is set to a first functional representation of the image information. Such a first functional representation may be setting the pixel information to substantially match the image information, adding or subtracting a light offset value, and/or interpolation of proximal pixel information.

If, however, the light source information is in the second state, the process proceeds to step 118. At step 118, the corresponding pixel information of the given pixel location is set to a second functional representation of the image information. Such a second functional representation of the image information may be setting the pixel information to substantially equal the image information, adding or deleting a lighting offset value, and/or interpolation of proximal pixel information. Note that, if the light source projection is changed to a new angle with respect to the viewing perspective, the preceding process would need to be re-executed based on the new light source projection.

Figure 7:
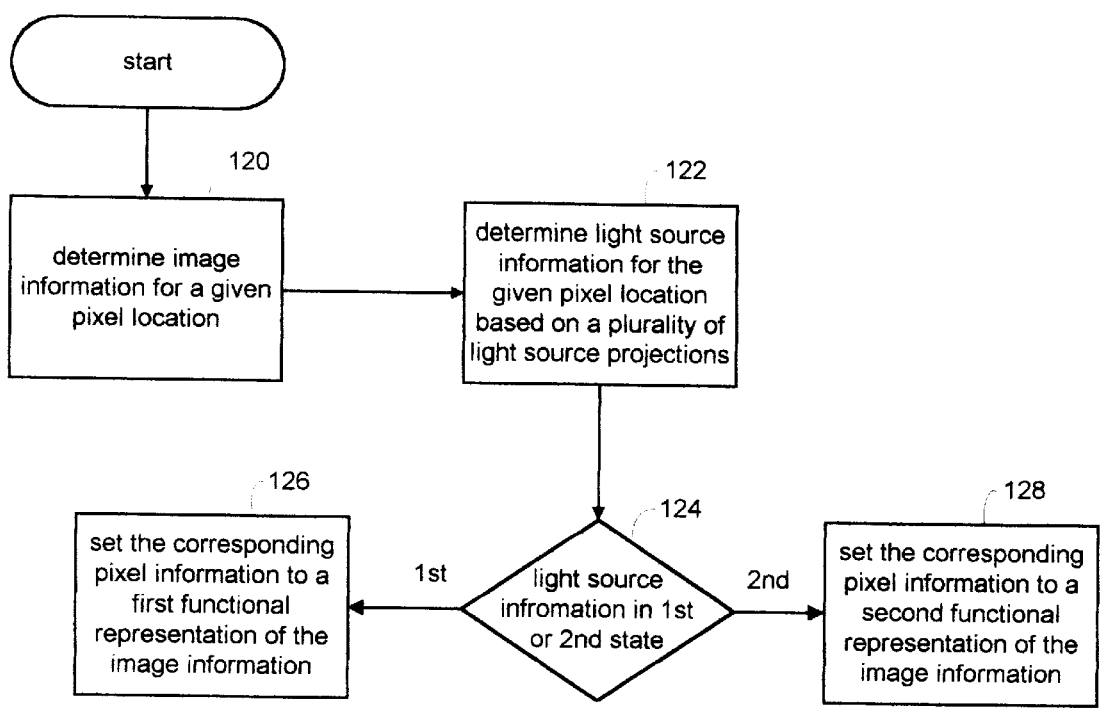
FIG. 7 illustrates a logic diagram of another process for rendering shadows on a three-dimensional scene in accordance with the present invention.

FIG. 7 illustrates a logic diagram for processing a three-dimensional scene having shadows. The process begins at step 120 where image information is determined for a given pixel location. Having done this, the process proceeds to step 122 where light source information is determined for the given pixel location based on a plurality of light source projections. Thus far, the discussion has presented the light source information being generated from a single light source. At step 122, however, the light source information is being generated from a plurality of light sources. Thus, referring to FIG. 1, the light source projection 32 may further include a second light source projection from the vantage point of pointing out towards the page. Thus, the shadows will be generated according to these two different light source projections.

Once the light source information has been generated for each light source, where the light source information may be light source texture maps of each light source, the process proceeds to step 124 where a determination is made as to whether the light source information is in a first or second state. If the light source information is in a first state, the process proceeds to step 126 where the corresponding pixel information of the given pixel location is set to a first functional representation of the image information. If, however, the light source information is in a second state, the process proceeds to step 128 where the corresponding pixel information is set to a second functional representation of the image information.

The preceding discussion has presented a method and apparatus for rendering three-dimensional scenes on a computer screen where such three-dimensional scenes include shadowing. By utilizing the teachings of the present invention, the memory requirements for a computer system rendering such three-dimensional scenes is of a constant value, which is approximately twice the memory needed to render an image without shadowing. By knowing the particular memory needed, the computer system may be optimized.

What is claimed is:

1. A method for rendering a three dimensional scene, the method comprising the steps of:

a) rendering the three dimensional scene from a viewing perspective that substantially matches a light source projection to produce a two-dimensional light source texture map; and b) rendering at least one object element of the three dimensional scene based on the light source texture map and image information to produce at least one rendered object element.

2. The method of claim 1 further comprises, within step (b), rendering the at least one object element based on at least one of: a texture map or color data as the image information.

3. The method of claim 1 further comprises, within step (b), rendering of the at least one object element a pixel location at a time which includes:
   setting, at a given pixel location, pixel information to the image information when, at the given pixel location, the at least one object element is not part of the light source texture map; and
   setting the pixel information to the image information adjusted by a lighting function when, at the given pixel location, the at least one object is part of the light source texture map.

4. The method of claim 3 further comprises adjusting the image information by at least one of: adding a light offset value and interpolation of pixel information of proximal pixel locations as the lighting function.

5. The method of claim 1 further comprises, within step (b), rendering the at least one object from a second viewing perspective, wherein the second viewing perspective does not substantially match the light source projection.

6. The method of claim 1 further comprises changing the light source projection, and rendering a new light source texture map.

7. A method for rendering, at a given pixel location, corresponding pixel information of a three dimensional object, the method comprising the steps of:
   a) determining image information for the given pixel location;
   b) determining light source information for the given pixel location based on a two-dimensional light source texture map, wherein the light source texture map is based upon a light source projection being proximal to a viewing perspective;
   c) when the light source information is in a first state, setting the corresponding pixel information to a first functional representation of the image information; and
   d) when the light source information is in a second state, setting the corresponding pixel information to a second functional representation of the image information.

8. The method of claim 7 further comprises determining the light source information to be in the first state when the given pixel location is not in line of sight of a light source projection.

9. The method of claim 8 further comprises establishing the first functional representation of the image information to be at least one of: substantially matching the image information, subtracting a lighting factor, and interpolating proximal pixel information.

10. The method of claim 7 further comprises determining the light source information to be in the second state when the given pixel location is in line of sight of a light source projection.

11. The method of claim 10 further comprises establishing the second functional representation of the image information to be at least one of: substantially matching the image information, adding a lighting factor, and interpolating proximal pixel information.

12. The method of claim 7 further comprises determining the light source information by rendering the three dimensional object based on a light source projection being proximal to a viewing perspective.

13. The method of claim 7 further comprises determining the light source information by rendering the three dimensional object based on a light source projection having a functional relationship with a viewing perspective.

14. A method for rendering at a given pixel location, corresponding pixel information of a three dimensional object, the method comprising the steps of:
   a) determining image information for the given pixel location;
   b) determining light source information for the given pixel location based on a plurality of light source projections corresponding to a plurality of two-dimensional light source texture maps;
   e) when the light source information is in a first state, setting the corresponding pixel information to a first f functional representation of the image information; and
   f) when the light source information is in a second state, setting the corresponding pixel information to a second functional representation of the image information.

15. The method of claim 14 further comprises establishing the first functional representation to be a function of the plurality of light source texture maps.

16. The method of claim 14 further comprises establishing the second functional representation to be a function of the plurality of light source texture maps.

17. A video graphics processor comprising:
   a processing device; and
   memory operably coupled to the processing device, wherein the memory stores programming instructions that when read by the processing device, causes the processing device to (a) render a three dimensional scene from a viewing perspective that substantially matches a light source projection to produce a two-dimensional light source texture map; and (b) render at least one object element of the three dimensional scene based on the light source texture map and image information to produce at least one rendered object element.

18. A video graphics processor comprising:
   a processing device; and
   memory operably coupled to the processing device, wherein the memory stores programming instructions that, when read by the processing device, causes the processing device to (a) determine image information for the given pixel location; (b) determine light source information for the given pixel location based on a two-dimensional light source texture map; (c) set the corresponding pixel information to a first functional representation of the image information when the light source information is in a first state; and (d) set the corresponding pixel information to a second functional representation of the image information when the light source information is in a second state.

19. A video graphics processor comprising:
   a processing device; and
   memory operably coupled to the processing device, wherein the memory stores programming instructions that, when read by the processing device, causes the processing device to (a) determine image information for the given pixel location; (b) determine light source information for the given pixel location based o n a plurality of two-dimensional light source texture maps; (c) set the corresponding pixel information to a first functional representation of the image information when the light source information is in a first state; and (d) set the corresponding pixel information to a second functional representation of the image information when the light source information is in a second state.

* * * * *